Patented Oct. 13, 1953

2,655,508

UNITED STATES PATENT OFFICE 2,655,508

PYRAZOLE COMPOUND

Reuben G. Jones, Indianapolis, Ind., assignor to Eli Lilly and Company, Indianapolis, Ind., a corporation of Indiana No Drawing. Original application November 16, 1950, Serial No. 196,093. Divided and this application August 6, 1952, Serial No. 303,000

1 Claim. (Cl. 260—310)

This invention relates to 3-cyanomethylpyrazole.

The novel compound of this invention can be represented by the formula

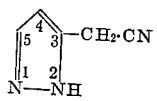

It should be noted that two isomeric forms of the pyrazole compounds exist because of a dynamic equilibrium. Thus, the compound can be represented by either of the following formulas:

Formula A           Formula B

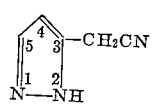    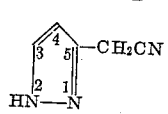

The two forms of the pyrazole compounds as represented by the given formulas are equivalent, and both are within the scope of this invention. For the purpose of convenience, the form of Formula A will be employed exclusively in this specification and the appended claim.

The novel pyrazole base of this invention is a liquid at ordinary temperatures.

Because of the basic nitrogen atom in the pyrazole ring, cyanomethylpyrazole readily forms acid addition salts, and these salts are included within the scope of the invention. The salts are readily prepared by methods commonly employed for preparing acid addition salts of organic bases. Suitable methods include the reaction of the stoichiometric equivalent of the desired acid with the desired free base in a mutual solvent, followed by evaporation of the solvent; the displacement of the acid of an acid addition salt of the desired base by another acid; and the like. Examples of acids useful for the purpose of forming salts with the novel bases include inorganic acids such as hydrochloric, hydrobromic, hydriodic, sulfuric, nitric, sulfamic, and phosphoric acids, and organic acids such as picric, acetic, maleic, tartaric, succinic, benzoic, lactic and salicylic acids.

3-cyanomethylpyrazole is useful as an intermediate in the preparation of 3-($\beta$-aminoethyl)-pyrazole, which is a gastric secretory stimulator.

This application is a division of my prior co-pending application Ser. No. 196,093, filed November 16, 1950.

The following specific example further illustrates this invention.

Example

To an anhydrous diazomethane solution prepared in 1.5 liters of ether from 103 g. (1 mol) of nitrosomethylurea were added 56 g. (1.0 mol) of freshly distilled propargyl alcohol. The solution was allowed to stand at room temperature for about 60 hours, the ether was evaporated, and the syrupy residue was fractionally distilled in vacuo. The fraction boiling from about 120° C. to about 150° C. at a pressure of 0.5 mm. of mercury was collected. The viscous liquid consisting of crude 3-hydroxymethylpyrazole was dissolved in 50 cc. of water, and added to a solution of 80 g. of picric acid in 1200 cc. of water at 100° C. The mixture was boiled with 5 g. of decolorizing carbon, filtered and cooled to about 40° C., whereupon a yellow crystalline precipitate of 3-hydroxymethyl-pyrazole picrate formed. The precipitate was filtered off, washed with absolute ethanol and dried.

3-hydroxymethylpyrazole picrate thus prepared melted at 183.5–184.5° C. Analysis showed the presence of 21.43 percent of nitrogen as compared with the calculated amount of 21.44 percent.

75 g. of 3-hydroxymethylpyrazole picrate were suspended in 200 cc. of nitrobenzene, and the mixture was extracted with 50 cc. of 12 N hydrochloric acid. The hydrochloric acid layer was removed and washed with three 50 cc. portions of chloroform to recover any undecomposed picrate. The nitrobenzene and the chloroform washings were combined and again extracted with a fresh 50 cc. portion of 12 N hydrochloric acid. The combined acid extracts were filtered, and the filtrate was evaporated to dryness in vacuo. The residue, comprising 3-hydroxymethylpyrazole hydrochloride, was dissolved in absolute ethanol, and the solution evaporated to dryness in vacuo. 3-hydroxymethylpyrazole hydrochloride was obtained in the form of a very hygroscopic, white, crystalline solid. After recrystallization from absolute alcohol-ether mixture, the 3-hydroxymethylpyrazole hydrochloride melted at 117–118° C.

To 40 cc. of thionyl chloride were added, in small portions, 30 g. (0.22 mol) of 3-hydroxymethylpyrazole hydrochloride. An immediate reaction resulted, with the formation of a clear solution. The solution was warmed on the steam bath for about 15 minutes, and the excess thionyl chloride was removed by evaporation in vacuo. A white crystalline residue comprising 3-chloromethylpyrazole hydrochloride, remained. The 3-chloromethylpyrazole hydrochloride was washed with anhydrous ether and dried in vacuo. It was stored in a vacuum desiccator over potassium hydroxide because of its deliquescent nature.

3-chloromethylpyrazole hydrochloride thus prepared melted at about 155–156° C. (dec.). Analysis showed the presence of 18.20 percent nitrogen as compared with the calculated amount of 18.31 percent.

A solution of 60 g. of potassium cyanide in 65 cc. of water was cooled in an ice bath, and to the cold solution was added with stirring over a period of about one hour a solution of 15.3 g. (0.10 mol) of 3-chloromethylpyrazole hydrochloride in 200 cc. of absolute ethanol. The reaction mixture was removed from the cooling bath and while standing at room temperature stirred for about 4 hours. The mixture was then filtered to remove inorganic salts formed during the reaction and the residue obtained was washed with two 200 cc. portions of 95 percent alcohol. The combined filtrate and washings were reduced by evaporation in vacuo to a volume of about 100 cc. A small portion of water was added to bring the precipitated inorganic salts into solution, and the resulting mixture was extracted with four 100 cc. portions of chloroform. The chloroform extracts were combined and evaporated in vacuo leaving a liquid residue comprising 3-cyanomethylpyrazole. The residue was distilled in vacuo, and the portion boiling at about 117–120° C. at the pressure of 0.4 mm. of mercury was collected.

3-cyanomethylpyrazole thus prepared had $n_D^{25}$ 1.5138. Analysis showed the presence of 38.94 percent nitrogen as compared with the calculated amount of 39.23 percent.

I claim:

3-cyanomethylpyrazole.

REUBEN G. JONES.

No references cited.